US012598576B2

(12) United States Patent
Zhou et al.

(10) Patent No.: US 12,598,576 B2
(45) Date of Patent: Apr. 7, 2026

(54) METHODS FOR POSITIONING IN LOW-POWER REDUCED CAPABILITY USER EQUIPMENT

(71) Applicant: Samsung Electronics Co., Ltd., Suwon-si (KR)

(72) Inventors: Yuhan Zhou, San Diego, CA (US); Philippe Sartori, Naperville, IL (US); Liang Hu, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 18/184,611

(22) Filed: Mar. 15, 2023

(65) Prior Publication Data

US 2023/0337173 A1 Oct. 19, 2023

Related U.S. Application Data

(60) Provisional application No. 63/419,636, filed on Oct. 26, 2022, provisional application No. 63/331,014, filed on Apr. 14, 2022.

(51) Int. Cl.
| | |
|---|---|
| *H04W 64/00* | (2009.01) |
| *G01S 5/00* | (2006.01) |
| *G01S 5/02* | (2010.01) |

(52) U.S. Cl.
CPC ........... *H04W 64/00* (2013.01); *G01S 5/0036* (2013.01); *G01S 5/02524* (2020.05)

(58) Field of Classification Search
CPC ..... H04W 64/00; H04W 4/029; H04W 24/08; G01S 5/0036; G01S 5/02524; G01S 5/0009; G01S 5/0205; G01S 2205/008; H04B 7/0641; H04B 7/0632; H04B 17/253; H04B 17/254; H04B 17/328; H04L 5/0048; Y02D 30/70
See application file for complete search history.

(56) References Cited

U.S. PATENT DOCUMENTS

| | | | |
|---|---|---|---|
| 2006/0293066 A1* | 12/2006 | Edge | ........................ H04W 4/02 455/456.3 |
| 2008/0108374 A1* | 5/2008 | Xiong | ..................... G01S 19/41 342/357.31 |
| 2021/0352613 A1 | 11/2021 | Yoon et al. | |
| 2021/0360461 A1 | 11/2021 | Duan et al. | |
| 2021/0360573 A1 | 11/2021 | Manolakos et al. | |
| 2021/0360577 A1 | 11/2021 | Manolakos et al. | |
| 2022/0039050 A1 | 2/2022 | Duan et al. | |

(Continued)

FOREIGN PATENT DOCUMENTS

| | | | | |
|---|---|---|---|---|
| WO | WO-2020164710 A1 * | 8/2020 | ........... | G01S 5/0205 |

*Primary Examiner* — Farid Seyedvosoghi
(74) *Attorney, Agent, or Firm* — Womble Bond Dickinson (US) LLP

(57) ABSTRACT

A system and a method for positioning by a user equipment (UE) may include receiving, by the UE, a radio resource control (RRC) signal comprising a measurement request, receiving, by the UE, at least two positioning reference signals (PRSs), each of the at least two PRSs corresponding to different fractions of an operating frequency range, determining that the at least PRSs are coherently combinable, aggregating, by the UE, the at least two PRSs in one measurement gap, and reporting, by the UE, measurements based on the aggregating the at least two PRSs.

11 Claims, 6 Drawing Sheets

(56)                        References Cited

U.S. PATENT DOCUMENTS

| | | | | |
|---|---|---|---|---|
| 2023/0079232 A1* | 3/2023 | Keating | ................. | H04W 8/22 |
| | | | | 370/329 |
| 2023/0126315 A1* | 4/2023 | Kumar | ................. | H04W 72/53 |
| | | | | 370/329 |
| 2024/0118370 A1* | 4/2024 | Duan | .................... | G01S 5/0242 |
| 2024/0407046 A1* | 12/2024 | Lee | ...................... | H04W 64/00 |
| 2025/0097876 A1* | 3/2025 | Thomas | ................ | H04W 74/04 |

* cited by examiner

METHODS FOR POSITIONING IN LOW-POWER REDUCED CAPABILITY USER EQUIPMENT

CROSS-REFERENCE TO RELATED APPLICATION(S)

This application claims the priority benefit under 35 U.S.C. § 119(e) of U.S. Provisional Application No. 63/419,636, filed on Oct. 26, 2022, and U.S. Provisional Application No. 63/331,014, filed on Apr. 14, 2022, both disclosures of which are incorporated by reference in their entirety as if fully set forth herein.

FIELD

The disclosure generally relates to user equipment positioning. More particularly, the subject matter disclosed herein relates to improvements to methods for positioning in low-power reduced capability user equipment.

SUMMARY

Various positioning techniques are standardized in $3^{rd}$ Generation Partnership Project (3GPP) New Radio (NR) Release-16 and Release-17. Release-18 continues with these positioning standards with additional areas to support Reduced Capability (RedCap) User Equipments (UEs) and Low Power High Accuracy Position (LPHAP). Thus, there is an ongoing desire for improving accuracy, integrity, and power efficiency. Service & System Aspects Working Group 1 (SA1) studied requirements for LPHAP—for example as defined in European Telecommunications Standards Institute (ETSI) Technical Specification (TS) 22.104, which included enhancements to RRC_INACTIVE and/or RRC_IDLE state—to evaluate Radio Access Network (RAN) functionality supporting such power consumption and positioning requirements. Thus, there is an ongoing desire to improve techniques that support such low power consumption and positioning requirements for RedCap UEs. Accordingly, angle-based and timing-based positioning techniques as described throughout the present disclosure may be utilized to perform positioning under these lower power consumption and reduced capability conditions.

According to an embodiment, a positioning method may include receiving, by a user equipment (UE), a radio resource control (RRC) signal including a measurement request; receiving, by the UE, at least two positioning reference signals (PRSs), each of the at least two PRSs corresponding to different fractions of an operating frequency range; determining that the at least PRSs are coherently combinable; aggregating, by the UE, the at least two PRSs in one measurement gap; and reporting, by the UE, measurements based on the aggregating the at least two PRSs.

The method may include determining that the at least two PRSs are coherently combinable is based at least on channel coherence time.

The method may include determining that the at least two PRSs are coherently combinable is based on at least one of clock drift and timing spacing between the different fractions of the operating frequency range.

The measurements may be based on the aggregation are reported to a Location Management Function (LMF).

Each of the at least two PRSs may be a narrowband PRS.

The UE may be a reduced capability (RedCap) UE or a low power high accuracy positioning (LPHAP) UE.

The at least two PRSs may be configured by the LMF.

The method may further include measuring, by a transmission reception point (TRP), an uplink sounding reference signal-reference signal received power (UL SRS-RSRP), an uplink sounding reference signal-reference signal path power (UL SRS-RSRPP), and uplink relative time of arrive (UL RTOA), and reporting the UL SRS-RSRP, the UL SRS-RSRPP, and the UL RTOA to the LMF.

The method may further including reporting, by the TRP, a differential report including differences between previously measured UL SRS-RSRP, UL SRS-RSRPP, and UL RTOA, and subsequently measured UL SRS-RSRP, UL SRS-RSRPP, and UL RTOA.

The method may further including reporting, by the UE, a downlink positioning reference signal-reference signal received power (DL PRS-RSRP) and a downlink positioning reference signal-reference signal path power (DL PRS-RSRPP) to the LMF.

The reporting of the measurements may be performed using configured grant (CG).

According to another embodiment, a positioning method may include receiving, by a user equipment (UE), a radio resource control (RRC) signal including a measurement request; receiving, by the UE, a configuration from a Location Management Function (LMF) to report aggregated bandwidth by the UE; receiving, by the UE, a plurality of positioning reference signal (PRSs), each of the plurality of PRSs corresponding to different fractions of an operating frequency range; determining that the plurality of PRSs are coherently combinable; performing, by the UE in one measurement gap, measurements based on determining a maximum aggregation bandwidth of the received plurality of PRSs; and reporting, by the UE, the determined maximum aggregation bandwidth to the LMF.

The method may further include reporting the measurements to the LMF.

The maximum aggregation bandwidth may be determined further based on channel coherence time.

The maximum aggregation bandwidth is determined further based on at least one of clock drift and timing spacing between the different fractions of the operating frequency range.

The UE may be a reduced capability (RedCap) UE or a low power high accuracy positioning (LPHAP) UE.

The PRS may be received from a network server.

The maximum aggregation bandwidth may be reported as a number of frequency hops.

The method may further include measuring, by a transmission reception point (TRP), an uplink sounding reference signal-reference signal received power (UL SRS-RSRP), an uplink sounding reference signal-reference signal path power (UL SRS-RSRPP), and uplink relative time of arrive (UL RTOA), and reporting the UL SRS-RSRP, the UL SRS-RSRPP, and the UL RTOA to the LMF.

The method may further include reporting, by the TRP, a differential report including differences between previously measured UL SRS-RSRP, UL SRS-RSRPP, and UL RTOA, and subsequently measured UL SRS-RSRP, UL SRS-RSRPP, and UL RTOA.

The may further include reporting, by the UE, a downlink positioning reference signal-reference signal received power (DL PRS-RSRP) and n downlink positioning reference signal-reference signal path power (DL PRS-RSRPP) to the LMF.

The reporting of the measurements may be performed using configured grant (CG).

According to another embodiment, a positioning method may include receiving, by a user equipment (UE), a downlink (DL) positioning reference signal (PRS); measuring, by the UE, at least one of a DL reference signal received power (RSRP) and a DL reference signal path power (RSRPP) for a plurality of transmission reception points (TRPs) based on the received DL PRS; transmitting, by the UE, an uplink (UL) sounding reference signal (SRS) including at least one of the RSRP and RSRPP to the TRPs.

The DL PRS includes the DL RSRP and/or the DL RSRPP.

The DL RSRP and/or the DL RSRPP is measured per-beam for each of the plurality of TRPs.

The method may further include reporting the measured DL RSRP and/or the DL RSRPP to a Location Management Function (LMF).

The reporting the measured DL RSRP and/or the DL RSRPP may include reporting a differential report of the measured DL RSRP and/or the DL RSRPP responsive to determining that a previous report included a full report.

The method may further include determining a direction of a network server based on the measured DL RSRP and/or DL RSRPP.

The transmitting of the UL SRS includes transmitting in the determined direction of the network server.

The transmitting of the UL SRS includes transmitting omni-directionally to the network server.

The method may further include sending, by the UE, a capability information corresponding to the UE to the LMF.

The capability information is indicative of the UE is a reduced capability (RedCap) UE configured to perform low-overhead angle-based positioning via a long-term evolution (LTE) positioning protocol (LPP).

According to another embodiment, a system may include a user equipment (UE) including a memory; and a processor configured to execute instructions stored in the memory to perform operations including: receiving, by the UE, a downlink (DL) positioning reference signal (PRS); measuring, by the UE, at least one of a DL reference signal received power (RSRP) and a DL reference signal path power (RSRPP) for a plurality of transmission reception points (TRPs) based on the received DL PRS; transmitting, by the UE, an uplink (UL) sounding reference signal (SRS) including at least one of the RSRP and RSRPP to the TRPs.

The DL PRS may include the DL RSRP and/or the DL RSRPP.

The DL RSRP and/or the DL RSRPP may be measured per-beam for each of the plurality of TRPs.

The operations may further include reporting the measured DL RSRP and/or the DL RSRPP to a Location Management Function (LMF).

The reporting the measured DL RSRP and/or the DL RSRPP may include reporting a differential report of the measured DL RSRP and/or the DL RSRPP responsive to determining that a previous report included a full report.

The operations may further include determining a direction of a network server based on the measured DL RSRP and/or DL RSRPP.

The transmitting of the UL SRS may include transmitting in the determined direction of the network server.

The transmitting of the UL SRS may include transmitting omni-directionally to the network server.

The operations may further include sending, by the UE, a capability information corresponding to the UE to the LMF.

The capability information may be indicative of the UE is a reduced capability (RedCap) UE configured to perform low-overhead angle-based positioning via a long-term evolution (LTE) positioning protocol (LPP).

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
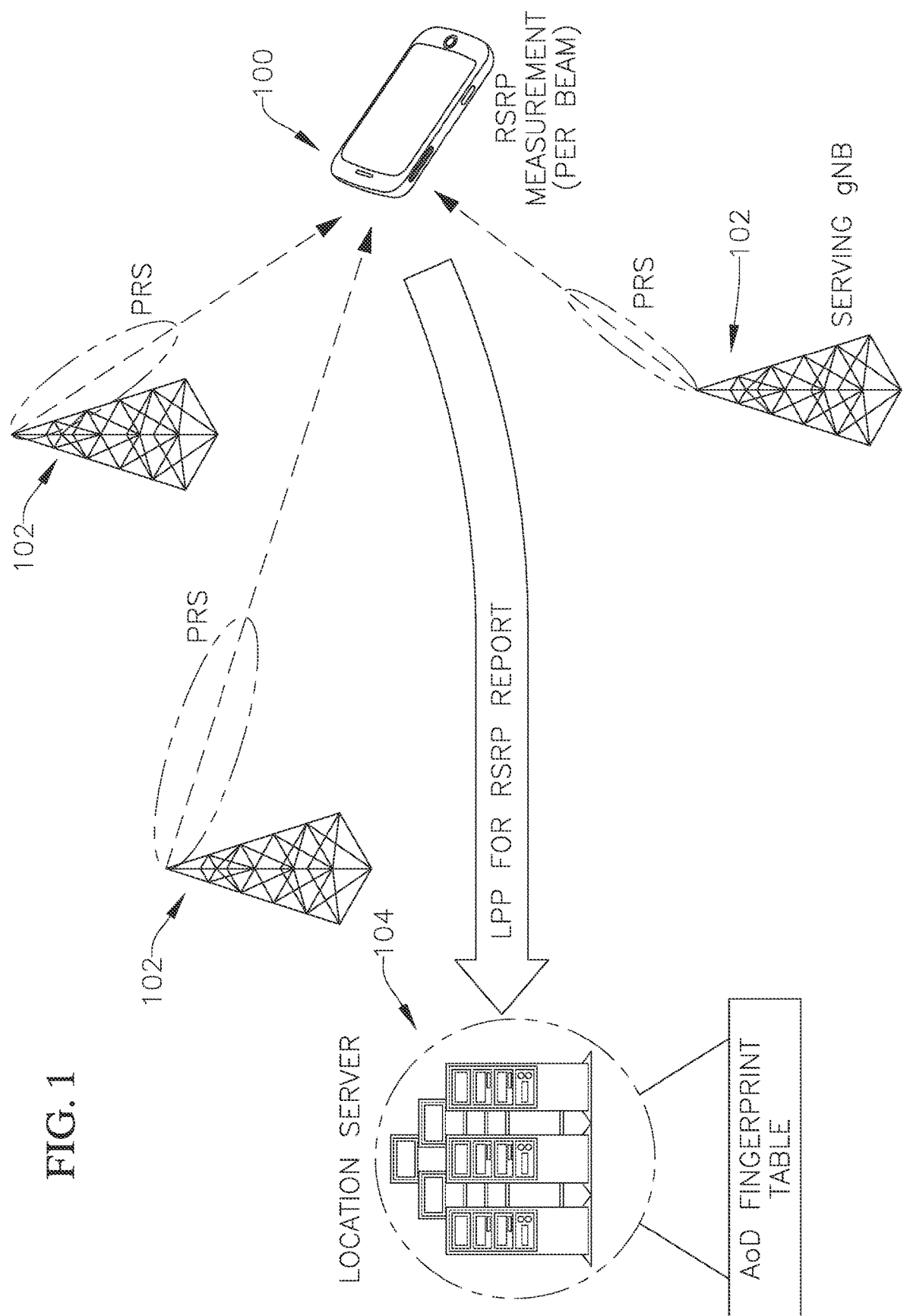
FIG. 1 illustrates a system overview of a Downlink Angle of Departure (DL-AoD) method.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.).

Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

Embodiments of the present disclosure are directed to positioning techniques that support low power and/or reduced capability devices. According to one technique, an angle-based positioning may be utilized because it can be used in lower bandwidth systems. Some embodiments include angle-based positioning protocols that satisfy the low power requirements of both RedCap and LPHAP.

Another technique that supports RedCap UEs that have smaller bandwidths (i.e., 20 MHz or 5 MHz) is to utilize frequency hopping and coherent processing across the hops for Positioning Reference Signal (PRS)/Sounding Reference Signal (SRS) so that a larger signal bandwidth may be utilized as a result of the frequency hopping, thus improving positioning accuracy. However, frequency hopping may also require the UE to determine whether coherent combining may be performed, and then aggregate the measurement results of multiple hops based on this determination. In some embodiments, even if no coherent combining can be achieved, aggregating over multiple hops may still be possible. However, the quality of the aggregation may be improved if it is determined that coherent combining is achievable.

Turning back to angle-based positioning, FIG. 1 illustrates a system overview of a Downlink Angle of Departure (DL-AoD) method. The system includes a UE 100, a plurality of g Node B (gNB) servers 102, and a location server 104 (e.g., Location Management Function (LMF)). In some embodiments, the UE 100 may be configured to measure and report, RSRP (Reference Signal Received Power) measurements and RSRPP (Reference Signal Received Path Power) for the first detected path on the DL PRS resources. In other embodiments, the UE 100 may use the NR PRS to make the RSRP measurements. Additionally, a hybrid method that leverages both DL-Time Difference of Arrival (TDOA) and DL-AoD using the same transmissions of PRS may be utilized. Accordingly, these methods may be referred to as a UE-assisted positioning technique.

Figure 2:
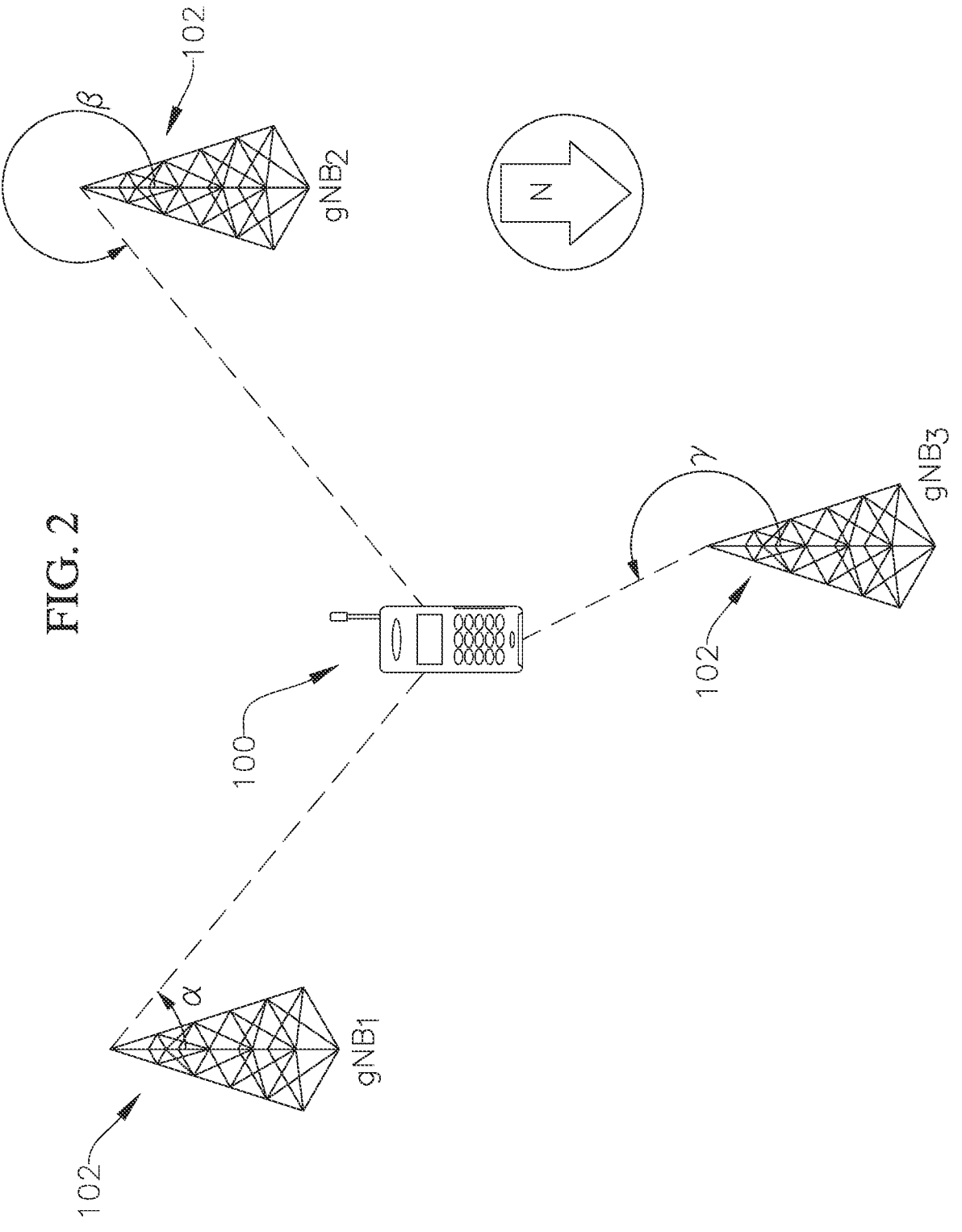
FIG. 2 illustrates a system overview of an Uplink Angle of Arrival (UL-AoA) method.

FIG. 2 illustrates a system overview of an Uplink Angle of Arrival (UL-AoA) method. In some embodiments, the AoA at a Transmission Reference Point (TRP) or gNB may be estimated using uplink signals. For example, in Long Term Evolution (LTE), the AoA measurement was specified as part of Enhanced Cell ID (E-CID) and defined for the serving cell. In NR, a full positioning solution using multiple AoAs may be specified. To do so, the AoA measurement may be defined at both the serving and neighboring cells. In some embodiments, the AoA is defined as the estimated angle of a UE 100 with respect to a reference direction which is geographical North, and positive in a counter-clockwise direction, as shown in FIG. 2.

To estimate the AoA of incident signals, a directional antenna, such as an adaptive phased array of two or more antenna elements, may be utilized. AoA-estimation techniques may be used to electronically steer beams in all possible directions and look for peaks in the output power. However, in such approaches, the angular resolution may be limited by the beamwidth of the array. Therefore, a large number of antenna elements may be required to achieve higher resolution. AoA measurement may also be performed by using a Multiple Signal Classification (MUSIC) method, which exploits the eigen-structure of an input data when organized in a time-space matrix. For example, UL SRS is used in NR Release 16 as the reference signal to measure the UL AoA.

Low Power High Accuracy Positioning is an integral part of a considerable number of industrial applications. The total energy needed for specific operation time for such low power high accuracy positioning optimized Internet of Things (IoT)-device is a combination of energy for positioning (which varies depending on the positioning method used), energy for communication/synchronization, and other factors that may be difficult to predict to take additional losses through, e.g., security, power management, microcontroller, and self-discharge of batteries. Example target applications that are low power high accuracy positioning include but are not limited to asset tracking in process automation, tracking of vehicles, and tool tracking. Other use cases may include: 1) Process automation: Dolly tracking (outdoor); 2) Process automation: Asset tracking; 3) Flexible modulare assembly area: Tool tracking in flexible, modular assembly areas in smart factories; 4) Process automation: Sequence container (Intralogistics); 5) Process automation: Palette tracking (e.g. in turbine construction); 6) Flexible modulare assembly area: Tracking of workpiece (in- and outdoor) in assembly area and warehouse; 7) Flexible modulare assembly area: Tool assignment (assign tool to vehicles in a production line, left/right) in flexible, modular assembly area in smart factories; 8) Flexible modulare assembly area: Positioning of autonomous vehicles for monitoring purposes (vehicles in line, distance 1.5 meter); 9) (Intra-)logistics: Asset tracking.

By way of example, Table 1 provides the operation time of the 5G enabled IoT device and duty cycle of the updated position information for different use cases.

For SRS transmission, subject to UE capability, the UE may be configured with an SRS resource for positioning associated with the initial UL BWP, and the SRS resource is transmitted inside the initial uplink bandwidth part (UL BWP) during RRC_INACTIVE mode with the same CP and numerology as configured for the initial UL BWP. Subject to UE capability, the UE may be configured with an SRS resource for positioning including frequency location and bandwidth, numerology, and CP length for transmission of the SRS in RRC_INACTIVE mode. If the transmission of SRS for positioning in RRC_INACTIVE mode with the switching time in unpaired spectrum, subject to UE capability, collides in time domain with other DL signals or channels or UL signals or channels, the SRS for positioning transmission is dropped in the symbol(s) where the collision occurs. The SRS resource for positioning in RRC_INAC-TIVE mode is configured in the same band and component carrier as the initial UL BWP.

In some embodiments, fingerprint positioning technique uses signal fingerprint and uses the received signal strength of every location (e.g., as fingerprints stored in the fingerprint database) to match the signal strength that is measured by the device locations to achieve positioning. Accordingly, the signal fingerprint positioning methods may support and enhance positioning of RedCap UEs with low power and small channel bandwidth.

In some embodiments, fingerprint positioning method for RedCap UEs may be configured such that the UE transmits UL SRS with omni-directional antenna for positioning. Each Transmission Reception Point (TRP) measures the UL AoA of the received UL SRS configured for the measurement, the UL SRS-Reference Signal Received Power (RSRP) of the received UL SRS configured for the measurement, the UL

TABLE 1

| Use Case # | Horizontal accuracy | Corresponding service level (22.261) | Positioning interval/duty cycle | battery life time/ minimum operation time |
|---|---|---|---|---|
| 1 | 10 m | Service Level 1 | on request | 24 months |
| 2 | 2 m to 3 m | Service Level 2 | <4 seconds | >6 months |
| 3 | <1 m | Service Level 3 | no indication | 1 work shift - 8 hours (up to 3 days, 1 month for inventory purposes |
| 4 | <1 m | Service Level 3 | 1 second | 6-8 years |
| 5 | <1 m | Service Level 3 | 5 seconds-15 minutes | 18 months |
| 6 | <1 m | Service Level 3 | 15 s to 30 s | 6-12 months |
| 7 | 30 cm | Service Level 5 | 250 ms | 18 months |
| 8 | 30 cm | Service Level 5 | 1 second | 6-8 years (no strong limitation in battery size) |
| 9 | 10 m | Service Level 1 | 20 minutes | 12 years (@20 mJ/ position fix) |

Positioning in RRC inactive (RRC_INACTIVE) mode is supported in Release-17 to reduce UE power consumption and signalling overhead. For the PRS reception, the UE in RRC_INACTIVE mode is expected to prioritize the reception of any other DL signals and DL channels over the reception of DL PRS. Thus, the UE in RRC_INACTIVE mode, subject to UE capability, processes the DL PRS outside and inside of the initial downlink bandwidth part (DL BWP). The UE may be configured with the same or different numerology and Cyclic Prefix (CP) for PRS resources than those of the initial DL BWP for DL PRS processing outside of the initial DL BWP. The UE may be configured with the same numerology and CP for PRS resources as those of the initial DL BWP for DL PRS processing inside of the initial DL BWP.

SRS-Reference Signal Received Path Power (RSRPP) for the i-th path, where i=1, 2, . . . , N (N≥1) and the UL Relative Time of Arrival (UL-RTOA) of the received UL SRS signal configured for the measurement. Finally, the TRP may then report the measurement vector including the UL SRS-RSRP, UL SRS-RSRPP, and UL-RTOA to the LMF through NR Positioning Protocol A (NRPPa).

In some embodiments, the UL AoA, UL SRS-RSRP, UL SRS-RSRPP, and UL-RTOA measurements may be considered as a "signal fingerprint vector" and the location calculation may be performed using a pattern matching approach. It is noted that $\theta$ is the measurement of the Azimuth Angle of Arrival (A-AoA), $\varphi$ is the measurement of the Zenith Angle of Arrival (Z-AoA), P is the measurement of the UL SRS-RSRP, $P_i$ for i=1, 2, . . . , N (N≥2) is the measurement of the UL SRS-RSRPP for the i-th path, and t is the measurement of the UL-RTOA. Accordingly, the signal fingerprint vector F for the UE may be expressed as:

$$F=[\theta,\varphi,P,P_1, \ldots ,P_N,t]$$

The positioning engine may then compare the received signal fingerprint vector F with the expected "database" of vectors and determine the UE location. Thus, the described signal fingerprint methods may be applied to the RedCap UEs operating on both FR1 and FR2 frequencies. In some embodiments a RedCap UE has more than one antenna (e.g., two antennas). In such cases, the UE can form a transmit (Tx) beam for SRS transmission. When UL SRS is transmitted using multiple Tx beams, the TRP first measures the SRS-RSRP for each Tx beam, and selects the strongest Tx beam with the largest SRS-RSRP. Then, the TRP may measure the AoA, SRS-RSPP, and UL-RTOA, for the beam k and report the measurements to the LMF.

In some embodiments, Small Data Transmission (SDT) method is used to transmit data by a UE that is in an inactive state. Thus, SDT is a transmission for a short data burst in a connectionless state where a UE does not have to establish and teardown connections when small amounts of data are to be sent. The principle of the SDT is relatively simple in that that the network configures radio resources beforehand for the data transmission in the inactive state. For example, if the conditions to use the configured radio resources are satisfied, the device transmits data and the RRC request message together via the configured radio resources. In the 3GPP standards, there are two types of the SDT depending on the ways to configure the radio resources: 1) SDT using a random access (RA); and 2) SDT using preconfigured radio resources.

The SDT that uses random access in NR standards may be referred to as Random Access based SDT (RA-SDT). For the RA-SDT, the UE may perform data transmission using shared radio resources of the random access procedure. Thus, contention with other devices may occur over the access to the shared radio resources. The shared radio resources for the SDT are broadcast by system information and may be configured as isolated from the one for a non-SDT RA procedure, i.e., the legacy RA procedure such as those provided in Release-16/Release-17. On the other hand, Configured Grant based SDT (CG-SDT) uses preconfigured radio resources dedicated to the UE. Thus, NR standards refer the SDT using preconfigured radio resource as the CG-SDT. The network may configure the configuration parameters of the preconfigured resources when transitioning the UE from the connected state to the inactive state. For example, an RRC release message transmitted from the network for a connection release contains the configuration parameters of the CG-SDT. In such case, no contention is expected for the SDT using the preconfigured radio resource because the configuration parameters are dedicated to the device.

In some embodiments, RedCap UEs operate with a smaller bandwidth than legacy UEs that operate with a full (larger) bandwidth. In Release-18, RedCap bandwidths may be as small as 5 MHz whereas the legacy UEs may have a bandwidth as large as 100 MHz or 200 MHz depending on the frequency range, e.g., FR1 or FR2. This smaller bandwidth of RedCap UEs may be a concern for positioning because traditional time-based techniques may require a larger bandwidth reference signal than to provide accurate measurements. Thus, various techniques such as angle-based positioning and frequency hopping methods are attractive for such low-bandwidth UEs.

Additionally, both RedCap and LPHAP UEs operate on reduced power and are there power constrained, and therefore limit their signaling overhead transmissions to conserve power as much as possible. On the other hand, some angle-based method protocols are relatively power hungry and may require a lot of reporting, and therefore, transmissions by the UEs. Therefore, there is the desire for a lower power, lower overhead angle-based positioning method.

Another solution may include the signal fingerprint method, wherein the gNBs perform the positioning measurements based on the received UL SRS and generate the fingerprint vector for pattern matching with the database. Accordingly, the embodiments of the present disclosure include techniques to reduce overhead that may results from such signal fingerprint methods.

Accordingly, protocols for an angle-based RedCap positioning and positioning with signal fingerprint will be described. According to some embodiments, DL-AoD positioning is based on per-beam RSRP measurements of DL-PRS performed at the UE DL-PRS RSRP measurement and/or UE DL-PRS DL-PRS RSRPP measurement. Thus, the TRPs are expected to transmit beamformed DL-PRS in a beam sweeping manner that may be measured by the UE. In some embodiments, the UE may report up to multiple RSRP/RSRPP measurements, derived on different DL-PRS resources, e.g., derived on different Tx beams of the same TRP. It should be noted that that the described angle-based methods may be suitable for FR2, but may also be suitable in FR1, for example, when a relatively larger number of TRPs are involved.

In some embodiments, when the downlink angle-based methods are used for RedCap UEs, signaling overhead may be relatively large, especially in FR1 because the UE may send feedback from multiple TRPs. Additionally, such feedback may be sent relatively frequently in order to maintain positioning accuracy. Accordingly, another solution may be to utilize uplink angled-based methods, where the UE transmits a reference signal (RS) (e.g., SRS in Release-16/Release-17 specifications), and the TRPs perform angle measurements. However, this method may also include a significant amount of UE transmission because the UE transmits the RSs for a duration that is long enough for the TRPs to perform beam-sweeping.

According to some embodiments of the present disclosure, another protocol is described which combines the UL SRS-RSRP/SRS-RSRPP measurement with the DL-AoD measurement to achieve higher improved positioning accuracy for RedCap UEs. The protocol for an angle-based RedCap UE positioning may include the UE first measuring the per-beam RSRP and/or RSRPP sent for a plurality of TRPs. The UE may then report the RSRP and/or RSRPP to the LMF through Long-Term Evolution (LTE) Positioning Protocol (LPP). At this stage, the UE may be approximately located. Next, the UE may transmit an UL SRS, which may be, but not necessarily, an omni-transmission for a single slot. Each TRP may perform an UL SRS-RSRP/SRS-RSRPP measurement and determine a more precise or an exact UE location. Thus, by using channel reciprocity, the TRPs are able to set their beams to receive the UL SRS even with highly directional beams. Thus, the UL SRS transmission can be short and omni-directional to conserve power. While such high-level procedure may be enabled in Release-17, the signaling overhead may be relatively high. However, this overhead may be reduced by limiting the per-beam RSRP report from the UE to be sent only when required (e.g., when there is a beam change), and adapting the UL SRS transmission periodicity from the UE according to conditions.

Furthermore, in some embodiments, the RF signal fingerprinting method described earlier may be used for the positioning of RedCap UEs and low power UEs (LPHAP). To reduce the signaling overhead for measurement reporting in the signal fingerprint method, the TRP may report the difference between the current measurement and the previous measurement. More particularly, when the positioning is initiated, the TRP may report the measurement vector including the UL SRS-RSRP, UL SRS-RSRPP, and UL-RTOA to the LMF. If a full report has been previously sent, the TRP may send just a differential report, which is a vector that includes the differences between the current measured SRS-RSRP and previous reported SRS-RSRP, the differences between the current measured SRS-RSRPP and previous reported SRS-RSRPP for all the paths configured to be measured, and the differences between the current measured UL-RTOA and previous reported UL-RTOA.

Figure 3:
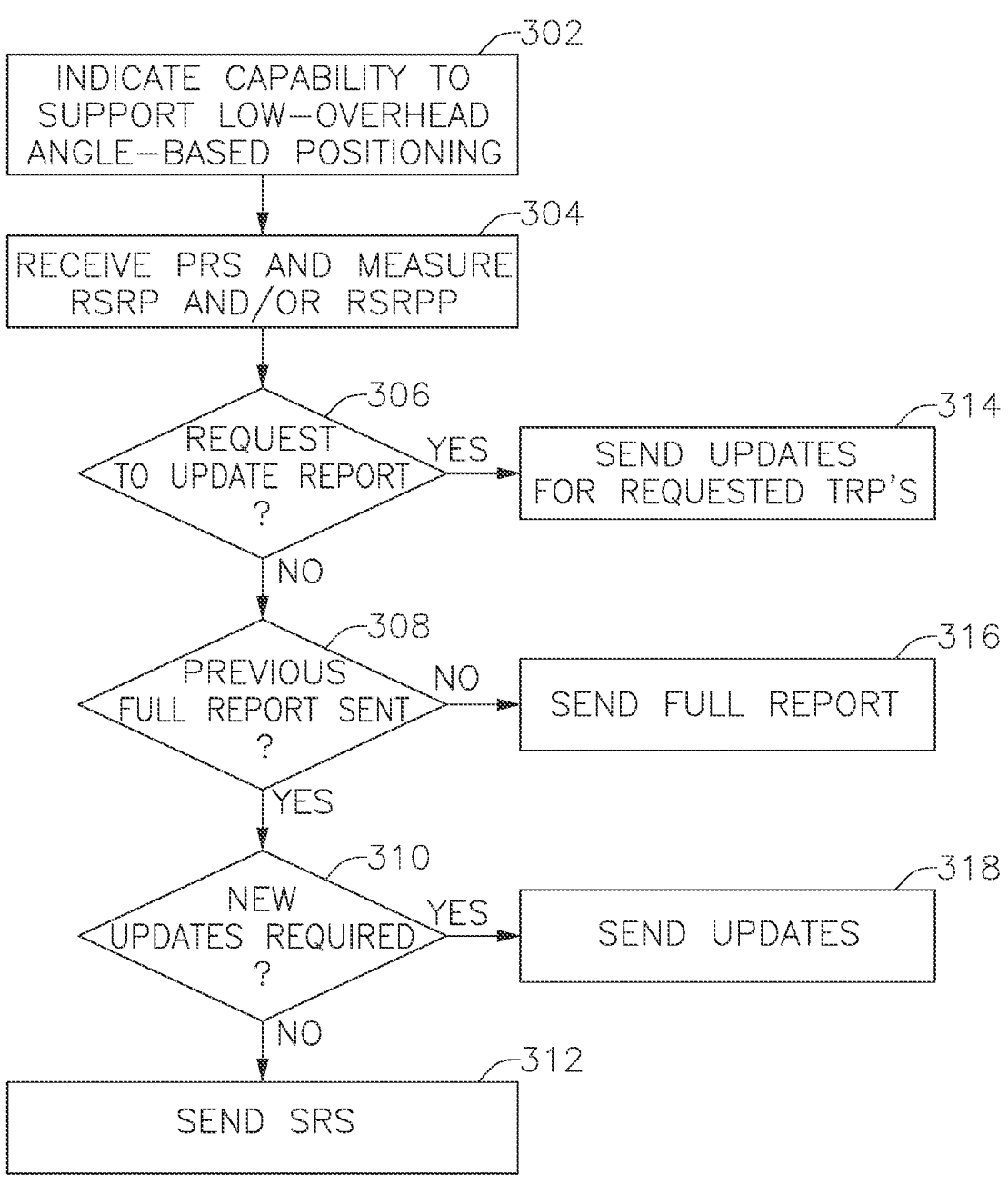
FIG. 3 is a flow chart of an angle-based positioning protocol according to various embodiments of the present disclosure.

FIG. 3 is a flow chart of an angle-based positioning protocol according to various embodiments of the present disclosure. The protocol relies on the UE sending a limited reporting or no reporting when there is no need to report, for example, because there are no change or only small changes. The UE then sends a short-duration uplink signal so that TRPs can refine the location and compensate for small location changes.

First, if the UE is a RedCap UE, the fact that the UE is a RedCap UE needs to be reported. Thus, the RedCap UE reports information that it is capable of supporting RedCap positioning to the LMF through the LPP at step 302. In essence, the UE needs to indicate that it can send limited feedback on its measurements from the PRS. In addition, the UE may indicate that it can transmit the SRS only if needed. For example, if the UE has not moved, then UE does not have to send the SRS, whereas if the UE speed is low, the UE can send a low-density SRS (in time).

In RRC connected mode, the PRS for RedCap positioning may be transmitted periodically inside the active BWP of the RedCap UE at step 304. If the PRS is outside of the active BWP of the RedCap UE, then the measurement gap may be utilized for the positioning measurement. If the PRS is designed to be within the active BWP, which is 20 MHz for the RedCap UE, a new PRS configuration may be proposed for RedCap positioning. More particularly, the information element (IE) dl-PRS-ResourceBandwidth may have a different maximum number for different subcarrier spacing (SCS). It should be noted that in the case where the legacy UE (i.e., non-RedCap UE) and the RedCap UE coexist in the same system, the TRP may transmit the wideband PRS used in Release-16/Release-17 positioning. Then the RedCap UE can perform the PRS-RSRP and or PRS-RSRPP measurements on the received PRS within its supported active BWP.

In RRC inactive/idle mode, the PRS can be transmitted either outside or inside of the initial DL BWP of the RedCap UE. In the case where PRS processing is transmitted outside of the initial DL BWP of the RedCap UE, the SCS, CP type of DL PRS may be the same or different as the initial DL BWP of the RedCap UE. In the case where the DL PRS processing is transmitted inside of the initial DL BWP of the RedCap UE, the SCS, CP type of DL PRS may be the same as for the initial DL BWP of the RedCap UE. The UE may receive PRS in a similar manner to a legacy UE (e.g., according to Release-17). However, the reporting of the measurement may be drastically different. For example, the UE reports the best beam it receives from each TRP. If the best beam has not changed between two measurements, then the UE may not have to report the best beam. Therefore, the network may assume that if new best beam is not reported, then the previously indicated best beam may still be valid.

In one solution, the UE may have moved slightly. By receiving the SRS and monitoring the signal quality, a TRP may notice that the beam that was reported as the best beam may no longer be valid. In such a case, the network may request the UE to report the best beam for a subset of the TRPs only at step 306, and at step 314, updates for the requested TRPs may be sent.

When positioning is initiated, all of the TRPs need to know what their best beam is for that particular UE. If such a determination has not been done, the UE may send a full beam report for all of the TRPs transmitting PRS at step 308. The UE may be probed by the network to send this full report at step 316. Alternatively, the TRP may determine this on its own, e.g., the TRP may self-determine the beam direction based on the previous downlink transmission. This is particularly beneficial for LPHAP UEs that operate in the RRC_IDLE mode because the UE may have more autonomy on its operation than in the RRC_CONNECTED mode. In some embodiments, the full report includes the largest measured RSRP values and the associated PRS index for each TRP. The network can request UE to send the full report through Downlink Control Information (DCI) or MAC Control Element (MAC CE), or the UE can decide by itself if it determines that the best Tx beams changes from the previous reporting.

If a full report has been previously sent, the UE only needs to send a differential report. Therefore, it does not report anything if the best beam has not changed. If the best beam has changed, the UE reports the new best beam for these TRP(s). Thus, at step 310, the UE determines whether it needs to send new updates, and if yes, the updates are sent at step 318. In such a case, the UE may report an indication of the changes of the best Tx beam for each TRP. The indicator could be either 0 (best beam does not change) or 1 (best beam changes). If the indicator is 0, the UE reports the difference between current RSRP and the previous RSRP; if the indicator is 1, UE reports the current RSRP and the associated PRS index for the RSRP measurement.

For the angle-based RedCap positioning, the UL SRS will be transmitted using the same spatial filter as the Rx beam with which UE measures the largest DL-PRS RSRP at step 312. The UL SRS can be configured as either aperiodic (which is triggered by DCI) or semi persistent (which is trigger by MAC CE). If the SRS is configured as aperiodic by DCI, the time offset between the SRS transmission and the last PRS reception may be configured by the gNB.

In some embodiments, the SRS is sent if there are meaningful (e.g., substantial) variations. For instance, if the UE can determine that it has not moved (e.g., based on accelerometers, Doppler measurements, etc.), then the UE may not report anything. In addition, the UE may determine that its location has not meaningfully changed since it last sent the SRS, and thus may skip sending the SRS. In essence, the rate of sending the SRS is adaptive with based on speed, and/or other parameters.

In order to enable this operation, a "CG-like" configuration of the SRS may be provided by the network to the UE. The UE may or may not transmit the SRS on this occasion, according to the changes in conditions. For UEs that are not in the RRC_CONNECTED mode, the UE may use the SDT procedure described earlier for SRS transmission. More particularly, for RA-SDT, the UE can send the SRS after receiving the Random Access Response (RAR) from gNB and the UE obtains the TA information. For CG-SDT (Configured Grant based SDT), the UE can send SRS in the preconfigured UL resources.

In some embodiments, the RedCap UE reports the measurement only for the UE-assisted positioning, wherein the UE location is calculated at the UE side. To reduce reporting overhead, the RedCap UE may only report the PRS index corresponding the largest measured DL PRS-RSRP to each TRP if the angle-based RedCap positioning method is used. The content of the measurement may include the indication of the changes of the best Tx beam for each TRP, where the indication may be binary value, 0 or 1; the PRS index associated the largest measured RSRP for each TRP if the best Tx beams changes from the previous reporting.

For RedCap UE in the RRC connected mode, and LPHAP in the RRC inactive with small data transmission (SDT), some embodiments may use configured grant (CG) uplink transmission, which enables the UL transmission without dynamic grant for the measurement reporting. There are two types of configured grant: 1) configured grant Type 1, where a grant configuration is provided by RRC, and 2) configured grant Type 2, where a grant is provided by PDCCH, and also activated or deactivated by PDCCH. A CG PUSCH to report the measurement for RedCap positioning may be configured with the same periodicity as the PRS, and may be scheduled after the PRS with a certain time distance to allow UE, taking into account the measurement processing delay and signal generation.

For LPHAP in RRC inactive/idle and the RACH is used, the measurement may be directly included in the PUSCH transmission (i.e., Msg3) in the random access procedure.

In some embodiments, utilizing frequency hopping may allow UEs operating with smaller bandwidths to utilize a larger bandwidth. For example, a RedCap UE operates with a smaller bandwidth, for example, 20 MHz or 5 MHz. By enabling frequency hopping and coherent processing across the hops for PRS/SRS, the RedCap UE will be able to effectively utilize a larger signal bandwidth, e.g., 100 MHz, thereby improving the positioning accuracy. However, frequency hopping may also rely on the UE to perform coherent combining and aggregate the measurement results of multiple hops of the frequency hops. Thus, in some embodiments, the UE may first determine coherent combinability PRS/SRS, which may indicate the quality of the aggregation or whether the aggregation may actually be beneficial. Therefore, if coherent combining is not achievable, then aggregation over multiple hops may not be beneficial, even though it may be possible.

Thus, according to an embodiment of the present disclosure, to achieve gain from coherent combining, the total transmission time of multiple hops should be within the channel coherence time. The coherence time and Doppler spread are inversely related, such that:

$$\text{Coherence Time} \approx \frac{1}{4 \times \text{Doppler spread}}$$

Table 2 provides values for the Doppler spread and associated channel coherence time for two frequency bands that are evaluated for RedCap UE positioning.

TABLE 2

| Carrier Frequency | UE speed | Max Doppler Spread | Channel Coherence Time |
|---|---|---|---|
| 3.5 GHz | 3 km/h | 9.72 Hz | 25.7 ms |
| 3.5 GHz | 30 km/h | 97.2 Hz | 2.57 ms |
| 3.5 GHz | 60 km/h | 194.4 Hz | 1.285 ms |
| 28 GHz | 3 km/h | 77.8 Hz | 3.21 ms |
| 28 GHz | 30 km/h | 777.8 Hz | 0.321 ms |
| 28 GHz | 60 km/h | 1555.6 Hz | 0.161 ms |

As shown in Table 2, the feasibility of frequency hopping for positioning of RedCap UEs depend on the time gap between two consecutive hops reported by the RedCap UE, the operating carrier frequency, and the UE speed (e.g., the speed at which the UE is moving or traveling). The table shows that it may not be feasible to apply frequency hopping for RedCap UE positioning in some cases. For example, if the UE reported the time gap between two consecutive hops to be 1 ms, then frequency hopping is not feasible in cases where the RedCap UE operates with a carrier frequency of 28 GHz and a UE speed greater than 30 km/h. In FR1, the coherence time is generally longer, thus resulting in more opportunities to perform channel aggregation of the PRS. It should be noted that in order to cover a bandwidth of 100 MHz, six hops with a 20 MHz bandwidth for each hop may be needed in order to account for overlap between the hops. Therefore, if the gap is 1 ms, then more than 6 ms may be needed. Accordingly, coherent combining may be applicable for very low UE speeds.

In some embodiments, when coherent combining cannot be achieved, and therefore is not applicable, each hop may be treated individually. Consequently, each individual measurements may then by averaged, by way of example. In addition, the number of hops that can be combined together depends on the channel coherence time. For instance, aggregating two hops according to the above example may results in a sizeable gain because, for example, aggregating two 20 MHz hops will results in a 40 MHz bandwidth. However, larger aggregations may be difficult because the coherence time may be too small. Thus, when reporting measurements, the UE may also report the bandwidth it used for the combined PRS.

Accordingly, in some embodiments, the UE may decide whether to perform frequency hopping, depending on whether it would actually be beneficial. Moreover, the UE may be configured to indicate the number of aggregated frequency hops there are in the measurement report.

In some embodiments, the measurement may be performed by the UE during a window of time, which may be referred to as a measurement gap. The measurement gap may be determined and/or set by a higher level network such as gNB, and during this measurement gap, the UE prioritizes and performs measurements. During periods that are outside of this measurement gap, the UE may perform other functions such as data communications (e.g., transmit and/or receive data). Accordingly, the UE may prioritize these other functions and therefore may not be able to perform measurement functions as requested by the RRC. In such case, the UE may be required to determine which functions it wants to prioritize. Therefore, to ensure that the UE performs measurement functions, the aggregation should be performed in one measurement gap.

Figure 4:
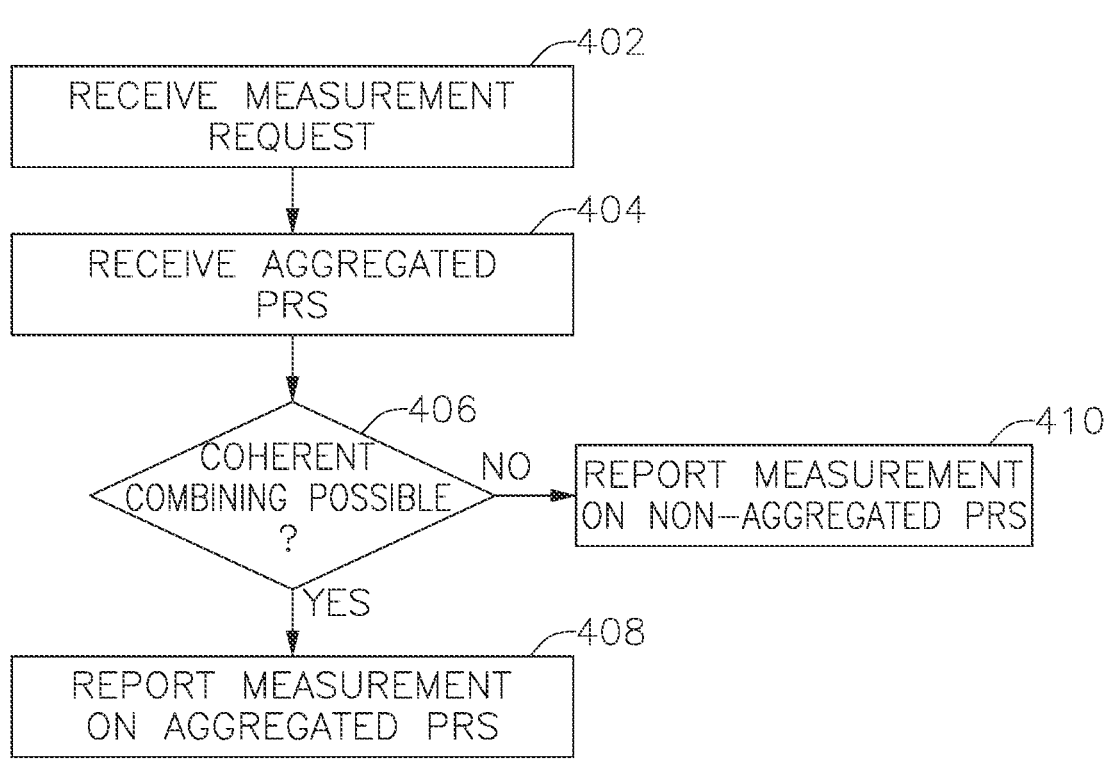
FIG. 4 is a flow chart of a method for UE operation where the frequency hopping is performed by the network server, and a determination is made by the UE whether to perform aggregation with frequency hopping, according to various embodiments of the present disclosure.

FIG. 4 is a flow chart of a method for UE operation where the frequency hopping is performed by the network server (e.g., gNB), and a determination is made by the UE whether to perform aggregation with frequency hopping, according to an embodiment of the present disclosure. According to this technique, the UE may receive a measurement request through RRC signaling at step 402. In other words, the transmitter is configured to either perform frequency hopping or not depending on whether the UE indicates to the transmitter that the UE is capable or desires to perform aggregation. The measurement request may generally be of an existing format but a field may be added to the measurement request information element (IE) to indicate that aggregated PRS may be used. For example, a binary 1 in this field may indicate that the UE is able to perform aggregation, whereas a binary 0 may indicate that the UE is unable to perform aggregation.

If the UE is able to perform aggregation, then the UE sends a signal back to the transmitter, and the UE then receives the aggregated PRS at step 404. That is, the UE receives a set of narrowband PRSs on different fractions of the band at different times. The UE, based on channel parameters such as the coherence time, and other parameters such as clock drift, time spacing between the frequency hops, etc., may determine whether coherent combining is possible at step 406. If it is possible, the UE reports the measurement based on the aggregated PRS at step 408. If it is not possible, it reports the measurement based on quantities computed on the non-aggregated PRS (e.g., a separate TDOA value for each hop, or an average of them, etc.) at step 410. It should be noted that in some embodiments, aggregation may still be performed even if coherent combining is not achievable. Additionally, in its measurement report, the UE may include information as to whether the measurement was performed using the aggregated or non-aggregated PRS. Accordingly, this technique is particularly useful when up to two hops can be aggregated together.

Figure 5:
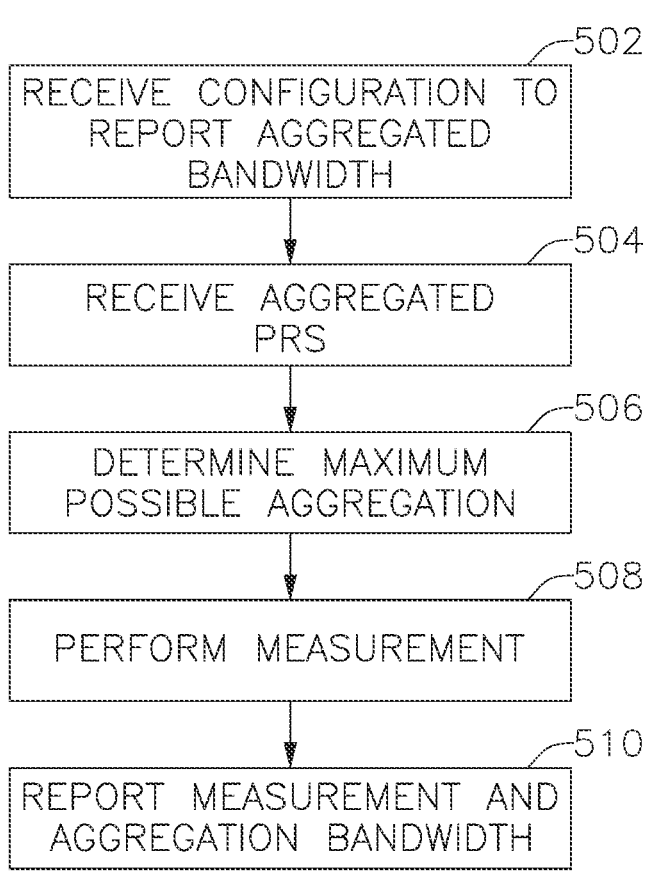
FIG. 5 is a flow chart of a method for UE operation where frequency hopping is performed by the UE and the UE determines the number of frequency hops to perform, according to various embodiments of the present disclosure.

However, in some instances, it may be beneficial to aggregate more than two hops to further improve positioning. For example, a 20 MHz UE may aggregate six hops to fully utilize a 100 MHz bandwidth. Accordingly, frequency hopping may be performed by the UE (e.g., RedCap UE) to achieve such further aggregation. FIG. 5 is a flow chart of a method for UE operation where frequency hopping is performed by the UE and the UE determines the number of frequency hops to perform, according to various embodiments of the present disclosure.

According to this technique, the UE reports the aggregated bandwidth on which it has performed the measurement at step 502. More particularly, the UE receives a measurement request through RRC signaling, and the measurement request may be of an existing format. One field may be added to the measurement request to indicate that aggregated PRS may be used. The UE then receives the aggregated PRS at step 504. In the case of Tx hopping, the UE receives a set of narrowband PRSs on different fractions of the band at different times. In other embodiments, the UE performing frequency hopping and therefore a wideband PRS (e.g., a legacy PRS) may be received and the UE may perform Rx hopping. The UE, based on channel parameters such as the coherence time, and other parameters such as clock drift, time spacing between the frequency hops, etc., determines on how many hops coherent combining is possible at step 506. The UE then performs measurements on the highest amount of (e.g., maximum) aggregated bandwidth that can be supported by the UE at step 508. The UE then reports the measurement and the aggregation bandwidth to the transmitter (e.g., gNB). In some embodiments, the aggregation bandwidth may be reported as a number of hops. Furthermore, it should be noted that the UE may determine the number of hops or aggregation bandwidth autonomously.

Accordingly, UEs may autonomously determine whether or not to perform frequency hopping, and if so, determine the number of frequency hops to aggregate. Moreover, frequency hopping may be performed either by the UE or by the network server to improve positioning measurements, particularly in UEs with reduced capabilities and low-power constraints.

Figures 6, 7:
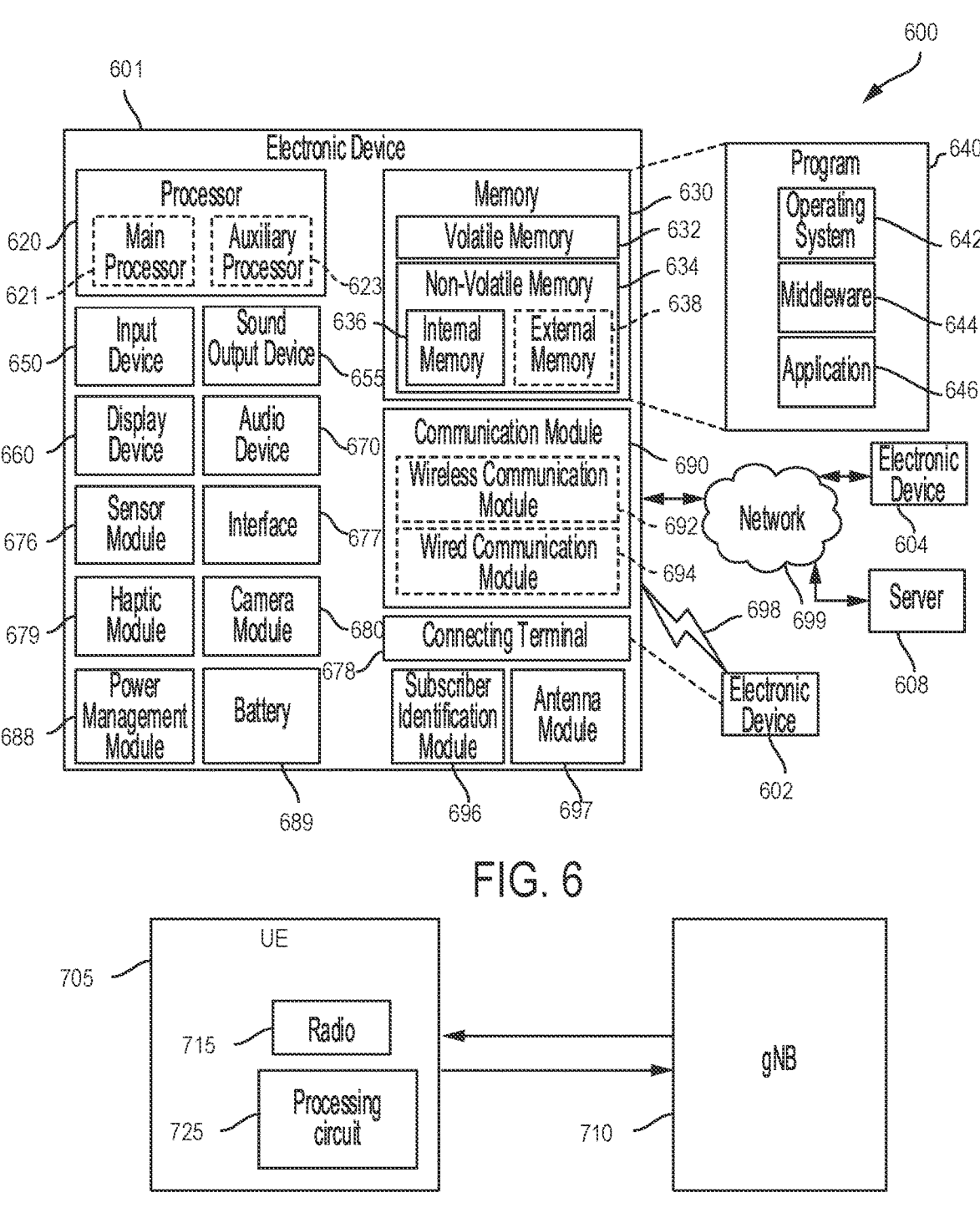
FIGS. 6-7 are block diagrams of an electronic device in a network environment, according to various embodiments of the present disclosure.

FIG. 6 is a block diagram of an electronic device in a network environment 600, according to an embodiment.

Referring to FIG. 6, an electronic device 601 in a network environment 600 may communicate with an electronic device 602 via a first network 698 (e.g., a short-range wireless communication network), or an electronic device 604 or a server 608 via a second network 699 (e.g., a long-range wireless communication network). The electronic device 6601 may communicate with the electronic device 604 via the server 608. The electronic device 601 may include a processor 620, a memory 630, an input device 640, a sound output device 655, a display device 660, an audio module 670, a sensor module 676, an interface 677, a haptic module 679, a camera module 680, a power management module 688, a battery 689, a communication module 690, a subscriber identification module (SIM) card 696, or an antenna module 694. In one embodiment, at least one (e.g., the display device 660 or the camera module 680) of the components may be omitted from the electronic device 601, or one or more other components may be added to the electronic device 601. Some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute software (e.g., a program 640) to control at least one other component (e.g., a hardware or a software component) of the electronic device 601 coupled with the processor 620 and may perform various data processing or computations.

As at least part of the data processing or computations, the processor 620 may load a command or data received from another component (e.g., the sensor module 646 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). The auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. The display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. The audio module 670 may obtain the sound via the input device 650 or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. The interface 677 may include, for example, a high-definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. The connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement)

or an electrical stimulus which may be recognized by a user via tactile sensation or kinesthetic sensation. The haptic module 679 may include, for example, a motor, a piezo-electric element, or an electrical stimulator.

The camera module 680 may capture a still image or moving images. The camera module 680 may include one or more lenses, image sensors, image signal processors, or flashes. The power management module 688 may manage power supplied to the electronic device 601. The power management module 688 may be implemented as at least part of, for example, a power management integrated circuit (PMIC).

The battery 689 may supply power to at least one component of the electronic device 601. The battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. The communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. The antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

Commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

FIG. 7 shows a system including a UE 705 and a gNB 710, in communication with each other. The UE may include a radio 715 and a processing circuit (or a means for processing) 720, which may perform various methods disclosed herein. For example, the processing circuit 620 may receive, via the radio 715, transmissions from the network node (gNB) 710, and the processing circuit 720 may transmit, via the radio 715, signals to the gNB 710.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

Abbreviations

| | |
|---|---|
| AoA/AOD | Angle of Arrival/Angle of Departure |
| BWP | Bandwidth Part |
| E-CID | Enhanced Cell ID |
| FR1/FR2 | Frequency Range 1/Frequency Range 2 |
| LMF | Location Management Function |
| LPP | LTE Positioning Protocol |
| PRS | Positioning Reference Signal |
| PRS-RSRP | PRS Reference Signal Received Power |
| PRS-RSRPP | PRS Reference Signal Received Path Power |
| RedCap UE | Reduced Capability UE |
| SCS | Subcarrier Spacing |
| SRS | Sounding Reference Signal |
| SRS-RSRP | SRS Reference Signal Received Power |
| SRS-RSRPP | SRS Reference Signal Received Path Power |
| TRP | Transmission Reception Point |
| UE | User Equipment |

What is claimed is:

1. A positioning method comprising:
receiving, by a user equipment (UE), a radio resource control (RRC) signal comprising a measurement request;
receiving, by the UE, at least two positioning reference signals (PRSs), each of the at least two PRSs corresponding to different fractions of an operating frequency range;
determining that the at least two PRSs are coherently combinable based on one or more channel parameters;

aggregating, by the UE, the at least two PRSs in one measurement gap; and reporting, by the UE, measurements based on the aggregating the at least two PRSs.

2. The method of claim 1, wherein the one or more channel parameters comprises channel coherence time.

3. The method of claim 1, wherein the one or more channel parameters comprises clock drift and timing spacing between the different fractions of the operating frequency range.

4. The method of claim 1, wherein the measurements based on the aggregation are reported to a Location Management Function (LMF).

5. The method of claim 1, wherein each of the at least two PRSs is a narrowband PRS.

6. The method of claim 1, wherein the UE is a reduced capability (RedCap) UE or a low power high accuracy positioning (LPHAP) UE.

7. The method of claim 1, wherein the at least two PRSs are configured by the LMF.

8. The method of claim 1, further comprising measuring, by a transmission reception point (TRP), an uplink sounding reference signal-reference signal received power (UL SRS-RSRP), an uplink sounding reference signal-reference signal path power (UL SRS-RSRPP), and uplink relative time of arrive (UL RTOA), and reporting the UL SRS-RSRP, the UL SRS-RSRPP, and the UL RTOA to the LMF.

9. The method of claim 8, further comprising reporting, by the TRP, a differential report comprising differences between previously measured UL SRS-RSRP, UL SRS-RSRPP, and UL RTOA, and subsequently measured UL SRS-RSRP, UL SRS-RSRPP, and UL RTOA.

10. The method of claim 8, further comprising reporting, by the UE, a downlink positioning reference signal-reference signal received power (DL PRS-RSRP) and a downlink positioning reference signal-reference signal path power (DL PRS-RSRPP) to the LMF.

11. The method of claim 1, wherein the reporting of the measurements is performed using configured grant (CG).

* * * * *